Patented July 10, 1951

2,559,650

UNITED STATES PATENT OFFICE 2,559,650

PREPARATION OF D-TARTARIC ACID

Lewis B. Lockwood and George E. N. Nelson, Peoria, Ill., assignors to the United States of America as represented by the Secretary of Agriculture No Drawing. Application October 28, 1949, Serial No. 124,252

7 Claims. (Cl. 195—47)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the preparation of d-tartaric acid by bacterial oxidation of 5-keto-d-gluconic acid salts and, more particularly to a fermentation method of producing d-tartaric acid employing Pseudomonas bacteria.

The practical production of tartaric acid has heretofore been limited to the recovery of the naturally occurring acid compounds as a by-product in the wine industry, and the chemical oxidation of carbohydrate materials. In U. S. Patent No. 2,197,021, Pasternack describes the oxidation of 5-keto-d-gluconic acid and its salts by an oxygen-containing gas to produce tartaric acid.

In U. S. Patent No. 2,314,831 Kamlet describes a fermentation method for producing d-tartaric acid from glucose employing *Acetobacter suboxydans*. However, this process is attended by several disadvantages. The yield of tartaric compounds is very low, and it is evidently necessary to add a compound of vanadium to reduce the formation of oxalic acid. Moreover, the patented process involves a multistage conversion. Glucose is converted to gluconic acid, then the gluconic acid is converted to 5-keto-d-gluconic acid, which in turn is to be converted into the desired tartaric products. The formation of this multiplicity of acids introduces various complexities of oxidative inhibition and salt solubility as explained by the patentee. These disadvantages probably account for the fact that appreciable yields of tartaric acid or its salts by Acetobacter fermentation of glucose are difficult to obtain.

We have discovered that 5-ketogluconic acid salts can be converted to d-tartaric acid or its salts by fermentation with *Pseudomonas fluorescens*, and that, moreover, no oxalic acid compounds are formed during the process. The total absence of oxalic acid compounds is a distinct advantage, since tartaric acid and its salts are commonly used in food. The 5-keto-d-gluconic acid compounds are prepared from calcium 5-keto-d-gluconate which may be obtained as described in Stubbs et al. U. S. Patent No. 2,318,641.

The conversion of calcium 5-keto-d-gluconate may be accomplished, for example, by dissolving it in dilute mineral acid, such as sulfuric, and then passing the acid solution through a bed of ion exchange material. Ion exchange materials operating on the hydrogen cycle are preferred. The effluent free acid is neutralized with a basic potassium compound, such as the hydroxide or carbonate. It is also feasible to accomplish the conversion by treating the calcium salt with sulfuric acid or other calcium precipitant to precipitate and remove the calcium as an insoluble salt. Other methods of accomplishing the conversion are obvious and will readily occur to those skilled in the art.

Our investigations have shown that the ability to produce consistent appreciable yields of d-tartaric acid from a carbohydrate or a carbohydrate-derived source is peculiar to *Pseudomonas fluorescens*. Of the score or more of microorganisms investigated for production of the acid, which included typical species of Pseudomonas, Acetobacter and Aerobacter, all showed negative or practically negative results except the *Pseudomonas fluorescens*.

According to our process a soluble salt of 5-keto-d-gluconic acid, such as for example the sodium, potassium or other alkali metal or ammonium salt, is dissolved in an aqueous culture medium. Considerable latitude in the selection of nutrients may be used. Any of the usual organic or inorganic sources of nitrogen may be used, as for example corn steeping liquor, urea, amino acids or ammonium salts. We prefer corn steeping liquor for convenience, and because it furnishes small quantities of other growth promoting substances such as vitamins, the presence of which is desirable. The culture medium is then inoculated with *Ps. fluorescens* and the fermentation conducted under submerged aerobic conditions.

The pH of the medium is maintained between 3 and 9 during the fermentation. The preferred range of pH is 4 to 8. At the extreme lower end of the operative range, around 3 and slightly above, when employing potassium or ammonium salts of 5-keto-d-gluconic acid as the starting material, bitartrate salts tend to precipitate in the fermentor, introducing certain mechanical recovery difficulties, but the actual course of the fermentation is apparently not adversely affected. At a pH above 9, the viability of the organism begins to be affected slightly. In general, the pH of the fermentation medium is self-regulatory. If necessary to adjust the pH within the desired range, this may be accomplished by known methods such as automatic control devices, the addition of soluble bases, acids or buffering agencies.

The temperature of the fermenting mixture may vary from 20° to 40° C., but the preferred temperature for the production of tartaric acid is within the range of 25° to 35° C.

The fermenting medium may be agitated and aerated with an oxygen-containing gas according to methods well known in the art; several of which are described in the Stubbs et al. patent previously mentioned. The fermentation is continued until the 5-keto-d-gluconate is substantially used up; i. e., for about 3 to 17 days. The d-tartaric acid may be recovered from the fermentation by conversion to the potassium salt and subsequent acidification to about pH 3.5.

The following example illustrates the invention.

*Example*

A mash was prepared containing potassium 5-keto-d-gluconate equivalent to 92.1 g. of 5-keto-d-gluconic acid per liter. As nutrients, 0.25 g. per liter of $MgSO_4 \cdot 7H_2O$, 0.6 g. per liter of $KH_2PO_4$, 2 g. per liter of urea, and 10 g. per liter of corn steeping liquor were added. The mash was sterilized by filtration, and fermented in a rotary fermentor at 5 R. P. M. under 15 pounds p. s. i., with an aeration rate of 400 ml. air per liter mash per minute. After 17 days, the mash was filtered to remove bacteria and acidified with hydrochloric acid to pH 3.5, whereupon potassium hydrogen tartrate precipitated. The yield of potassium hydrogen tartrate was 22.4 percent of theory based on the 5-keto-d-gluconic acid consumed.

We claim:

1. A process for the production of d-tartaric acid which comprises inoculating an aqueous nutrient solution containing a source of assimilable nitrogen and potassium salt of 5-keto-d-gluconic acid with *Pseudomonas fluorescens*, cultivating the bacteria under submerged aerobic conditions at a pH within the range of 4 and 8 and at a temperature within the range of 20° and 40° C. for a period of 3 to 17 days, adding sufficient acidic ion to precipitate the tartaric acid as potassium hydrogen tartrate.

2. The process of claim 1 in which the nutrient medium contains corn steep liquor, urea, magnesium sulfate, and potassium dihydrogen phosphate, and the aeration rate is not less than about 400 ml. air per liter mash per minute.

3. A process for the production of d-tartaric acid which comprises inoculating an aqueous nutrient solution containing a source of assimilable nitrogen and a water soluble salt of 5-keto-d-gluconic acid with *Pseudomonas fluorescens*, cultivating the bacteria under submerged aerobic conditions, the pH of the solution being maintained between 3 and 9 during said fermentation and the temperature being between about 20° C. to 40° C., thereby producing d-tartaric acid.

4. The process of claim 3 in which the pH is between 4 and 8, and the salt is taken from the group consisting of alkali metal and ammonium salts.

5. The process of claim 3 in which the salt is potassium 5-keto-d-gluconate.

6. The process of claim 3 in which the assimilable nitrogen source of corn steeping liquor.

7. The process of claim 3 in which the assimilable nitrogen source is corn steeping liquor and the salt is potassium 5-keto-d-gluconate.

LEWIS B. LOCKWOOD.
GEORGE E. N. NELSON.

REFERENCES CITED

The following references are of record in the file of this patent:

UNITED STATES PATENTS

| Number | Name | Date |
|---|---|---|
| 2,277,716 | Lockwood | Mar. 31, 1942 |
| 2,314,831 | Kamlet | Mar. 23, 1943 |